(12) United States Patent
Plichta et al.

(10) Patent No.: US 8,436,821 B1
(45) Date of Patent: May 7, 2013

(54) SYSTEM AND METHOD FOR DEVELOPING AND CLASSIFYING TOUCH GESTURES

(75) Inventors: Jakub Plichta, San Anselmo, CA (US); Tim Kukulski, Oakland, CA (US); Joerg Beckert, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 754 days.

(21) Appl. No.: 12/623,317

(22) Filed: Nov. 20, 2009

(51) Int. Cl.
*G06F 3/041* (2006.01)

(52) U.S. Cl.
USPC ............................ 345/173; 345/156; 715/863

(58) Field of Classification Search .................. None
See application file for complete search history.

(56) References Cited

U.S. PATENT DOCUMENTS

| | | | |
|---|---|---|---|
| 4,484,179 A | | 11/1984 | Kasday |
| 5,252,651 A | | 10/1993 | Criquilion |
| 7,643,006 B2 | | 1/2010 | Hill et al. |
| 2005/0249172 A1 | | 11/2005 | Malik |
| 2006/0267966 A1 | * | 11/2006 | Grossman et al. ............ 345/179 |
| 2007/0177803 A1 | | 8/2007 | Elias et al. |
| 2007/0242056 A1 | | 10/2007 | Engelhardt et al. |
| 2008/0036743 A1 | * | 2/2008 | Westerman et al. .......... 345/173 |
| 2008/0155480 A1 | * | 6/2008 | Van Wyk et al. .............. 715/863 |
| 2008/0192005 A1 | | 8/2008 | Elgoyhen et al. |
| 2008/0204426 A1 | | 8/2008 | Hotelling et al. |
| 2009/0273571 A1 | | 11/2009 | Bowens |
| 2010/0031202 A1 | * | 2/2010 | Morris et al. ................ 715/863 |
| 2010/0241973 A1 | * | 9/2010 | Whiddett ..................... 715/762 |
| 2011/0018731 A1 | | 1/2011 | Linsky et al. |

OTHER PUBLICATIONS

"A Multi-Touch Three Dimensional Touch-Sensitive Tablet," CHI '85 Proceedings, Apr. 1985, pp. 21-25, ACM.

Westerman, Wayne (1999). "Hand Tracking,Finger Identification, and Chordic Manipulation on a Multi-Touch Surface". U of Delaware PhD Dissertation, pp. 1-363.

"Human Input to Computer Systems: Theories, Techniques and Technology," 1994 William Buxton, et al., pp. 1-4, downloaded from http://www.billbuxton.com/inputManuscript.html.

Krueger, Myron, W., Gionfriddo, Thomas., &Hinrichsen, Katrin (1985). Videoplace—An Artificial Reality, Proceedings of the ACM Conference on Human Factors in Computing Systems (CHI'85), 35-40.

"Issues and Techniques in Touch-Sensitive Tablet Input", Buxton, et al. Computer Graphics, 19(3), Proceedings of SIGGRAPH'85, 215-223.

(Continued)

*Primary Examiner* — Lixi C Simpson
(74) *Attorney, Agent, or Firm* — Wolfe-SBMC

(57) ABSTRACT

Various embodiments of a system and methods for touch gesture recognition are described. A software developer may create a set of custom touch gestures by training a gesture development tool. A new touch gesture may be input to the tool by repeatedly executing the gesture on a touch-enabled device or by depicting parameters of the gesture in a graphical language. A developer may provide a software command associated with the gesture. A unique, software-recognizable gesture descriptor may be created to represent each gesture. The gesture descriptor, a unique identifier of the gesture descriptor and the command associated with the gesture may all be stored as an entry in a configuration file. The file may be embedded in a software application and may be used by a gesture classification module to translate user touch gestures applied to the software application into commands to be executed by the software application.

20 Claims, 6 Drawing Sheets

OTHER PUBLICATIONS

"The Sensor Frame Graphic Manipulator," May 8, 1992, NASA-CR-194243, downloaded from http://ntrs.nasa.gov/archive/nasa/casi.ntrs.nasa.gov/19940003261_1994003261.pdf, pp. 1-28.

"A Study in Two-Handed Input," Buxton and Myers, Computer Systems Research Institute Univ. of Toronto, 1986, Proceedings of CHI '86, pp. 321-326.

Benko, H., Wilson, A. D., and Baudisch, P. (2006). Precise Selection Techniques for Multi-Touch Screens. Proc. ACM CHI 2006 (CHI'06: Human Factors in Computing Systems, 1263-1272.

Steve Hodges, et al., "ThinSight: Versatile Multi-touch Sensing for Thin Form-factor Displays," Proceedings of the 20th annual ACM symposium on User interface software and technology, pp. 259-268, 2007.

U.S. Appl. No. 12/789,743, filed May 28, 2010, Tim Kukulski.
U.S. Appl. No. 12/957,292, filed Nov. 30, 2010, Tim Kukulski.
Office Action from U.S. Appl. No. 12/957,292, mailed Oct. 2, 2012, Tim Kukulski, pp. 1-13.
U.S. Appl. No. 12/957,292, filed Nov. 30 2010, Tim Kukulski.
U.S. Appl. No. 12/789,743, filed May 28 2010, Tim Kukulski.

* cited by examiner

SYSTEM AND METHOD FOR DEVELOPING AND CLASSIFYING TOUCH GESTURES

BACKGROUND

Touch gesture technology provides hardware and software that allows computer users to control various applications via the manipulation of one or more digits (e.g., finger(s) and/or thumb) on the surface of a touch-enabled device. Touch gesture technology generally consists of a touch-enabled device such as a touch-sensitive display device (computer display, screen, table, wall, etc.), touchpad, tablet, etc., as well as software that recognizes multiple, substantially simultaneous touch points on the surface of the touch-enabled device.

Conventional systems limit touch gestures to the predefined gesture inputs recognized by the operating system of the touch-enabled device. For example, a touch gesture executed by swiping one finger horizontally across the surface of a touch-enabled device may be defined in an operating system as a command to advance to a next page or element. Touch gestures may also include multi-touch gestures. An example of a multi-touch gesture is making a "pinching" motion with two fingers to zoom in on an image displayed on a multi-touch capable display. Conventional systems may not allow software developers to change predefined touch gestures or define new touch gestures. As such, conventional systems limit software developers' abilities to differentiate touch gesture interfaces for software applications.

Conventional systems may limit the use of touch gesture technology such that only the predefined touch gestures supported by a particular operating system may be used to interact with a software application. For example, a user interfacing with a software application through a touch-enabled device may have a limited set of gestures available for sending a command to the software application. Software developers may also be limited by conventional systems which restrict the use of touch gestures to a predefined set of gestures supported by a particular operating system. A software developer designing a touch-based interface to a software application may be restricted to using, for the interface, only the set of predefined gestures supported by the operating system for which the software application is designed. However, the software developer may wish to differentiate the software application by providing support for a set of custom touch gestures that may be recognized as commands for the software application. For example, the developer may wish to support custom touch gestures that are more intuitive for a user within the context of the software application for which the interface is being designed.

SUMMARY

Various embodiments of a system and methods for developing and classifying touch gestures are described. The system for developing and classifying touch gestures, as described herein, may provide software application users and developers additional flexibility in using touch gesture technology. Embodiments of a touch gesture development system may provide a touch gesture development method for creating custom touch gestures. For example, a software developer may define a set of custom touch gestures which may indicate commands to be executed in a software application. Embodiments of a touch gesture development method may be implemented by a touch gesture development tool. A touch gesture development tool may be trained by a developer to recognize a new gesture. A developer may, via the user interface of the touch gesture development tool, input parameters that define the new touch gesture. In some embodiments, the touch gesture may be repeatedly input by a developer on a touch-enabled device until the touch gesture development tool has "learned" the new touch gesture. The developer may also specify a command associated with the new touch gesture within the context of an application being developed by the developer. Based on the parameters of the new touch gesture, the gesture development tool may create a gesture descriptor representing the touch gesture. The descriptor for each new touch gesture may be stored for use by the application. Data that associates each gesture descriptor with a command to be performed by the application when the touch gesture is received may also be stored for use by the application.

Embodiments of the touch gesture classification system may also provide a mechanism that enables a software application to recognize new touch gestures and determine associated commands or actions to take in response to receiving a new touch gesture. For example, a software application user may input any of the new touch gestures to indicate a command to be executed in the software application. Embodiments of a touch gesture classification method may be implemented by a gesture classification module. The gesture classification module may receive a gesture descriptor which represents the current touch gesture input. The gesture descriptor may generated using touch gesture data from user input applied to the surface of a touch-enabled device. The gesture classification module may compare the new gesture descriptor against existing stored gesture descriptors to determine the identity of the gesture. The software application may then determine or look up one or more commands associated with the gesture and perform the associated commands and/or actions.

Figure 1:
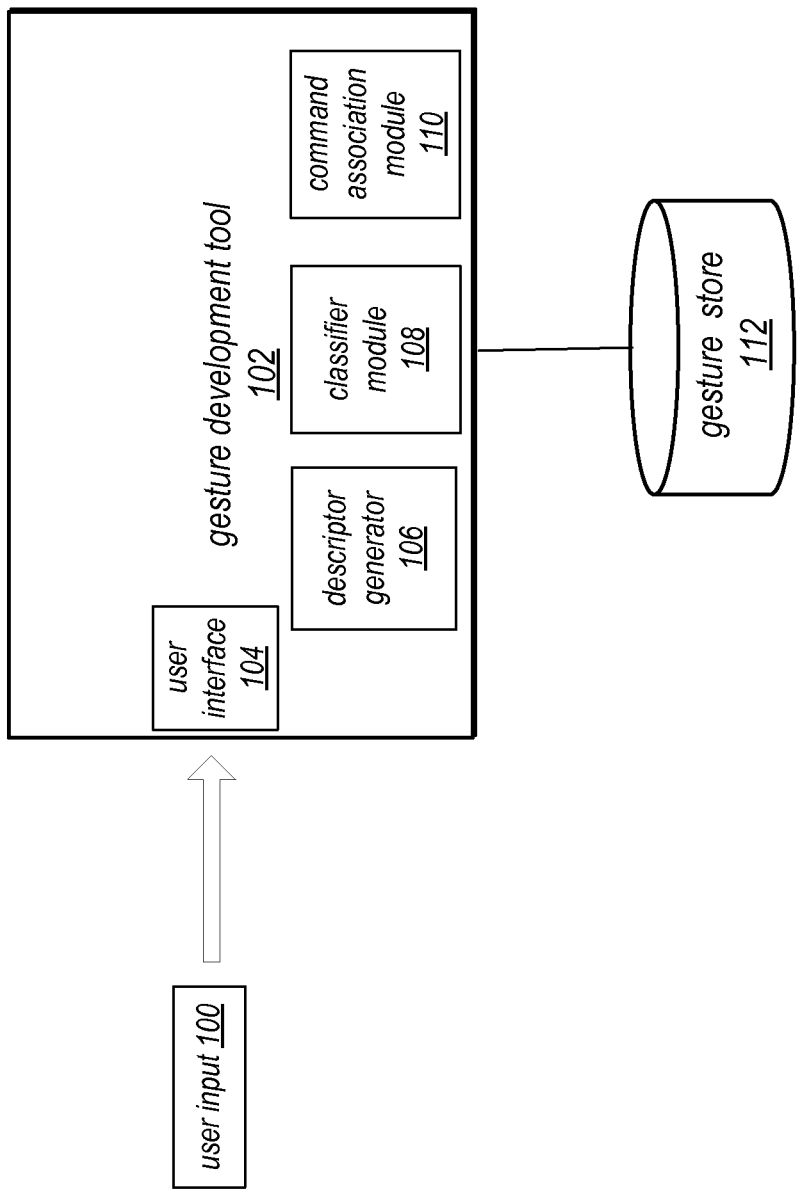
FIG. 1 illustrates an example of a gesture development tool which may be used to create a set of custom touch gestures, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and methods for touch gesture recognition are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a system and methods for developing and classifying touch gestures are described. The system for developing and classifying touch gestures, as described herein, may provide software application users and developers additional flexibility in using touch gesture technology. Embodiments of the system for developing and classifying touch gestures may provide a touch gesture development method for creating custom touch gestures. For example, a software developer may define a set of custom touch gestures which may indicate commands to be executed in a software application.

Embodiments of a touch gesture development method may be implemented by a touch gesture development tool. A touch gesture development tool may be trained by a developer to recognize a new gesture. A developer may, via the user interface of the touch gesture development tool, input parameters that define the new touch gesture. In some embodiments, the touch gesture may be repeatedly input by a developer on a touch-enabled device until the touch gesture development tool has "learned" the new touch gesture. In other embodiments, the developer may define the parameters of the new touch gesture using a gesture definition language. The developer may also specify a command associated with the new touch gesture within the context of a particular application being developed by the developer. Based on the parameters of the new touch gesture, the gesture development tool may create a gesture descriptor representing the touch gesture. The descriptor for each new touch gesture may be stored for use by the application. Data that associates each gesture descriptor with a command (as specified by the developer) to be performed by the application when the touch gesture is received may also be stored for use by the application.

Embodiments of the system for developing and classifying touch gestures may also provide a mechanism that enables a software application to recognize new touch gestures and determine associated commands or actions to take in response to receiving a new touch gesture. The set of new touch gestures may not have been defined for the software application during the development of the software application and, therefore, may be "new" to the software application. For example, a software application user may input any of the new touch gestures to indicate a command to be executed in the software application. The software application may access a shared data set of new touch gestures (e.g., a shared library of touch gestures), to classify the new touch gesture and determine a command associated with the new touch gesture. Embodiments of a touch gesture classification method may be implemented by a gesture classification module. The gesture classification module may receive, e.g., from a device driver or the system operating system, touch gesture data from user input applied to the surface of a touch-enabled device. In response to such touch gesture data, the gesture classification module may create a gesture descriptor which represents the current touch gesture input. The gesture classification module may compare the new gesture descriptor against existing stored gesture descriptors to determine the identity of the gesture. As described in further detail below, various parameters of the gesture descriptors may be compared to determine whether a new gesture matches any existing gestures. The gesture classification module may return, to the software application, unique identifiers of any matching existing gesture descriptors. The gesture classification module may return a unique identifier of the closest matching existing descriptor or a list of unique identifiers of a set of matching existing gesture descriptors. The list of unique identifiers may be ranked according to the accuracy with which each descriptor in the set of existing gesture descriptors matches the new gesture descriptor. The software application may then determine or look up one or more commands associated with the existing gesture descriptors and perform the associated commands and/or actions dependent on the current context of the software application.

Developing Touch Gestures

As described above, the system for developing and classifying touch gestures may implement a touch gesture development method which enables a software developer to create a set of custom touch gestures. Embodiments of a touch gesture development method, which may be implemented as or in a tool, module, plug-in, stand-alone application, etc., may be used to create a set of custom touch gestures and associate software commands with the custom touch gestures. For simplicity, implementations of embodiments of the touch gesture development method described herein will be referred to collectively as a gesture development tool.

FIG. 1 illustrates an example of a gesture development tool which may be used to create a set of custom touch gestures. As indicated at 100, input to gesture development tool 102 may be received via user interface 104, referred to herein as a gesture development interface. The input received via 104 may be gesture parameters which describe a custom touch gesture and a software command associated with the custom touch gesture. For example, a developer may input gesture parameters describing a custom touch gesture by executing the gesture on a touch-enabled device. Gesture development tool 102 may capture the touch gesture parameters and descriptor generator 106 may generate a gesture descriptor based on the parameters of the custom touch gesture. Classifier module 108 may compare the custom touch gesture to existing gestures in gesture store 112. Command association module 110 may associate the gesture descriptor with the software command input by the developer via user interface 104. Gesture development tool 102 may store the gesture descriptor and corresponding software command in gesture store 112. In other embodiments, the gesture descriptor and software command may be separately stored.

Figure 2:
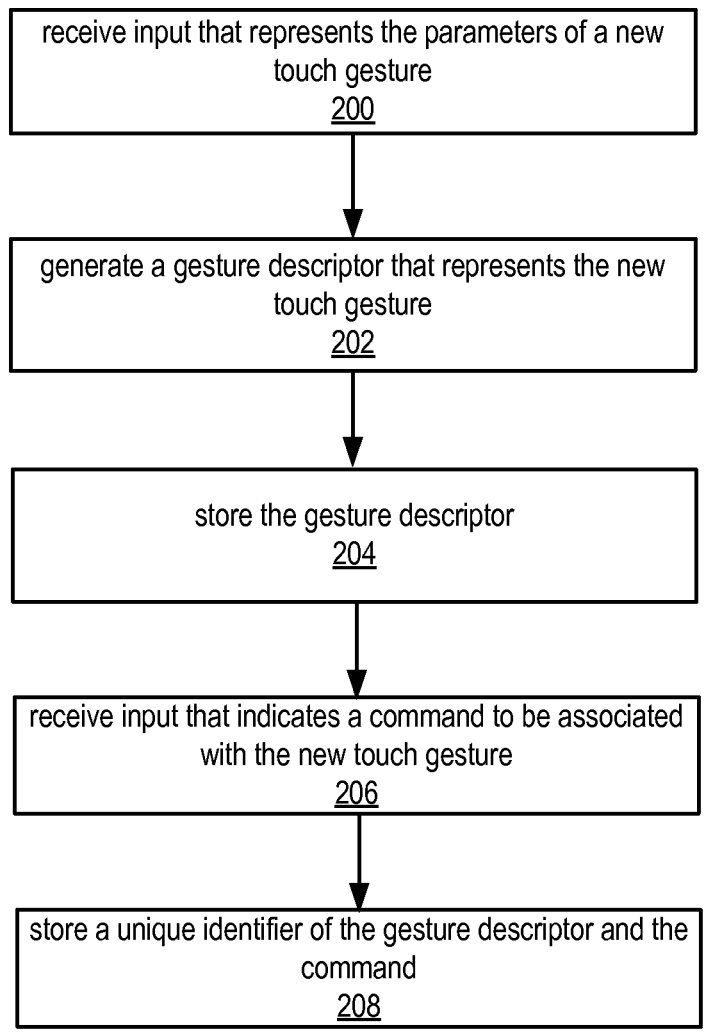
FIG. 2 is a flowchart of a general method for developing custom touch gestures, according to some embodiments.

FIG. 2 is a flowchart of a general method for developing custom touch gestures, according to some embodiments. The method may, for example, be implemented by a gesture development tool. The gesture development tool may include, as illustrated in FIG. 1, a gesture development interface through which a software developer may control the gesture development tool and provide inputs to the gesture development tool. As indicated at 200 of FIG. 2, the method for developing custom touch gestures may include receiving user input that represents the parameters of a new touch gesture. Such user input may be applied to the gesture development interface of the gesture development tool. Various embodiments of the gesture development interface may provide different mechanisms by which a developer may input gesture parameters that describe a new touch gesture.

Figure 3:
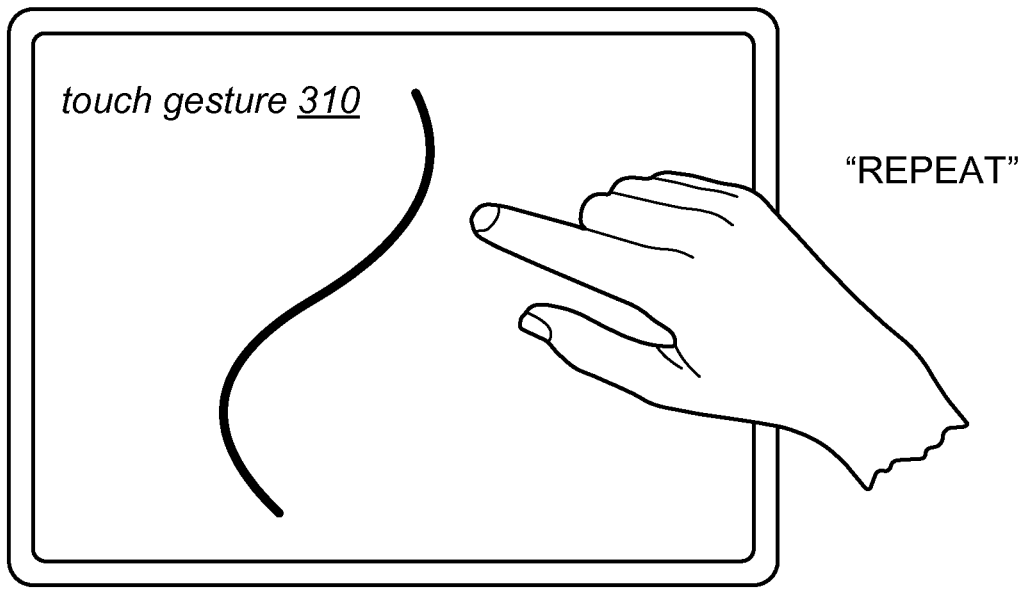
FIG. 3 illustrates an example of physical execution of a touch gesture on a touch-enabled device, according to some embodiments.

A developer may input a new touch gesture to the gesture development interface by physically executing the new touch gesture on a touch-enabled device. The developer may indicate the start of the touch gesture entry to the gesture development tool, for example, by selecting a "Start Gesture Entry" button in the gesture development interface. In other embodiments, the beginning of the physical execution of the touch gesture on the touch-enabled device may automatically indicate to the gesture development tool that the touch gesture entry has begun. FIG. 3 illustrates an example of the physical execution of a touch gesture on a touch-enabled device, as shown by the application of touch gesture 310 to touch-enabled device 300. FIG. 3 shows a developer placing a finger on the surface of, or proximate to, touch-enabled device 300 and executing the motion of touch gesture 310. New touch gestures applied to the gesture development interface may be, for example, gestures using one finger (or thumb), such as the touch gesture illustrated in FIG. 3. New touch gestures may also be multi-touch gestures using more than one finger and/or thumb to perform the touch gesture. An example of a multi-touch gesture may be using two fingers in a "pinching" motion to zoom in on an area of an image displayed on a touch-enabled device.

In some embodiments, the gesture development interface may be displayed on the touch-enabled device, allowing the developer to interact with the gesture development tool via the touch-enabled device. The gesture development interface may designate an area in which new touch gestures may be physically executed. A developer may apply the new touch gesture to the touch-enabled device within this designated area of the gesture development interface. In other embodiments, the gesture development tool may designate the full surface of a touch-enabled device as the input area for the new touch gesture. In such embodiments, the developer may apply the new touch gesture across the surface of the touch-enabled device.

A touch gesture may be described by a set of parameters which represent the various characteristics of the touch gesture. For example, a touch gesture may be described in terms of parameters such as the number of touch points (i.e. number of contact points with the surface of a touch-enabled device) of the gesture and the location of the gesture. Such parameters may be critical to the definition of a touch gesture, as a single parameter of a touch gesture may be used to distinguish the touch gesture over another touch gesture. For example, a "fast" horizontal swipe touch gesture may indicate a command to advance to a next page, whereas a "slow" horizontal swipe touch gesture may indicate a command to scroll across a page currently in view. In such an example, the speed parameter of the touch gesture is critical in creating an accurate description of the touch gesture. Examples of parameters that may describe a touch gesture may include, but are not limited to: number of digits used, touch points (i.e., coordinate positions of the digits), relative distance between touch points, trajectory of each touch point, amount of pressure applied at each touch point, speed of trajectories (i.e., speed of the touch gesture's motion), area of contact of each touch point, timeline (i.e., beginning, progression and end of the touch gesture), and scale (e.g. the radius of a circular touch gesture). Touch gestures may involve motion or other actions that occur over a period of time. Accordingly, the parameters of a touch gesture may represent the characteristics of the touch gesture over time. For example, the parameters may be represented on a timeline with multiple frames, where each frame indicates the value of a parameter at a particular point in time during the execution of the gesture.

In some embodiments, the definition of a touch gesture may include a parameter which specifies an area limitation for the touch gesture. More specifically, the touch gesture definition may specify that execution of the touch gesture may be limited to an area of a specified size. For example, a touch gesture definition may specify that the touch gesture may be executed within an area equivalent to 50% of the surface of the touch-enabled device or an area equivalent to 25% of the surface of the touch-enabled device. As another example, if the relative distance between touch points of a gesture is within a defined area limitation, the touch gesture may be classified as a single, independent gesture. The area limitation parameter of a touch gesture may enable the touch gesture classification system to recognize multiple, independent touch gestures applied to different areas on the surface of a touch-enabled device. For example, two users may independently apply touch gestures to the touch-enabled device, with one user applying a touch gesture to the left half of the device surface and the other user applying a touch gesture to the right half of the device surface. The touch gesture classification system may recognize the touch gestures as two independent gestures applied to limited areas of the device surface, rather than a single touch gesture applied across the full surface of the touch-enabled device.

The types of touch gesture characteristics supported by touch-enabled devices may vary between different types of devices. For example, some touch-enabled devices may support a set of common touch gesture characteristics such as touch point location, speed and direction. Other touch-enabled devices may support an extended set of touch gesture characteristics which may include common touch gesture characteristics and extended characteristics such as number of digits used (multi-touch gestures), amount of pressure applied at touch points, and area of contact of each touch point. Accordingly, the gesture development tool may define custom touch gestures based on a set of common and/or extended gesture characteristics. A developer may specify, via the user interface of the gesture development tool, parameters to include in sets of common and/or extended gesture characteristics. A developer may also specify whether a new custom touch gesture is defined by a set of common and/or extended gesture characteristics or defined by gesture characteristics individually specified by the developer.

The gesture development tool may support the development of touch gestures with multiple "analog" output parameters. An "analog" output parameter of a touch gesture is a parameter of the gesture that may be repeatedly and/or continuously updated throughout the execution of the touch gesture. The "analog" output parameters of a touch gesture may include a "begin" event, frequent "update" events executed throughout the duration of the gesture and an "end" event.

For example, a two digit touch gesture may define a circular region on the surface of a touch-enabled device, where the diameter of the circle may be defined by the distance between the two digits. Such a two digit touch gesture may include multiple gesture events which may indicate multiple commands, either independently or simultaneously. For example, the gesture events may include a zoom command, executed by "pinching" or spreading the digits to change the diameter of the circle; a rotation command, executed by rotating the angular position of the digits around the circle; and/or a pan command, executed by moving the digits to move the center point of the circle. Each of these gesture events may be considered an "information channel" (i.e., a separate set of information) associated with the two digit touch gesture. The gesture development tool may enable a developer to define how the information channels of a touch gesture with "analog" output parameters are to be returned to the software application. For example, the developer may specify that the information channel related to only the first detected gesture event should be returned to the software application. In this case, the end user may be restricted to executing one, independent gesture event at any given time. As another example, the developer may specify that all information channels representing all of the gesture events should be returned to the software application. In this case, an end user may be able to simultaneously execute the multiple gesture events. For example, the user may be able to execute simultaneous zoom, rotate and pan commands.

The characteristics of a new touch gesture input to the gesture development interface via execution of the gesture on a touch-enabled device may directly represent the parameters of the new touch gesture. For example, the speed of the user's motion during the execution of the new touch gesture may directly represent the speed parameter of the new touch gesture. As another example, the coordinates of the executed new touch gesture may directly represent the coordinate parameter of the new touch gesture. The gesture development tool may be configured to analyze the characteristics of the executed new touch gesture and store the characteristics as a set of parameters which describe the new touch gesture.

In some embodiments, a developer may repeatedly execute the new touch gesture on the touch-enabled device in order to "train" the gesture development tool to recognize the new touch gesture. As illustrated in FIG. 3, a developer may repeatedly execute touch gesture 310 on touch-enabled device 300. Repetitive input of a new touch gesture may reduce the margin of error that may be inherent in human entry on a touch-enabled device. For example, it may be unlikely that a user will input a perfectly formed touch gesture during a single entry of the touch gesture. Accordingly, the gesture development tool may incorrectly interpret a touch gesture when only a single entry of the touch gesture is available. However, a gesture development tool may be able to capture an accurate representation of a new touch gesture from multiple, repetitive entries of the new touch gesture.

The gesture development tool may capture and store the value of each gesture parameter for each iteration of a repeatedly executed new touch gesture. Accordingly, the gesture development tool may store a number of sets of gesture parameter values, with each set of gesture parameter values corresponding to an iteration of the new touch gesture by the developer. The gesture development tool may perform a statistical analysis of the multiple executed gestures in order to create an accurate representation of the new touch gesture. For example, the gesture development tool may calculate a mean and a standard deviation for each gesture parameter using the stored values of the parameter captured during each iteration of the new touch gesture. The gesture development tool may analyze the parameters of each executed gesture to determine whether any of the parameters have values that are more than a specified number of standard deviations away from the mean. Any iteration of the new touch gesture having one or more parameters with a value more than a number of standard deviations away from the mean may be considered an outlier that is not an accurate representation of the new touch gesture. The stored parameters for such an iteration of the new touch gesture may be discarded by the gesture development tool. The number of standard deviations used to evaluate the value of a gesture parameter may vary for each gesture parameter and may vary from embodiment to embodiment.

Upon receiving a number of gesture executions sufficient to generate an accurate statistical representation of the new touch gesture, the gesture development tool may indicate to the developer that the new touch gesture has been "learned" and that no more gesture executions are required. The number of gesture executions sufficient to generate an accurate statistical representation of the touch gesture may be different from embodiment to embodiment and may also depend on the characteristics and/or type of the gesture. In other embodiments, the developer may repeatedly execute the new touch gesture a desired number of times and then indicate to the gesture development tool that the new touch gesture entry is complete. The method used by the gesture development tool to create a statistical representation of the multiple new touch gesture entries may vary from embodiment to embodiment. For example, in one embodiment, the gesture development tool may use an average value calculated for each parameter to represent the new touch gesture.

The gesture development tool may allow a developer to specify, in the gesture development interface, information that further defines a new touch gesture. For example, a developer may input a new touch gesture to the gesture development interface by executing the new touch gesture on a touch-enabled device, as described above. In such an example, the developer may specify in the gesture development interface that a particular parameter of the new touch gesture is not applicable to the description of the new touch gesture. For example, the developer may specify that the speed of the new touch gesture is not an applicable parameter of the new touch gesture. More specifically, a developer may specify, by indicating that the speed of the new touch gesture is not an applicable parameter, that the new touch gesture indicates a particular software command, regardless of the speed at which the new touch gesture is performed. As another example, a developer may input, via the gesture development interface, specific characteristics that define one or more parameters of a new touch gesture. For example, a developer may indicate that the duration of a one digit touch should be within a range of 1 to 2 seconds. As yet another example, a developer may indicate that certain parameters of a new touch gesture are not applicable to the definition of the touch gesture, but a function applied to the parameters may be used to define the new touch gesture. For example, the distance between two touchpoints may be irrelevant, but a change in the distance, d(t), between the touchpoints as the touch gesture is executed may be an important characteristic of the tough gesture. In an example of two digits swiped in a parallel motion across a touch-enabled surface, the distance between the digits may not be an applicable parameter, but the amount of change in the distance between the digits as the gesture is executed may be an important parameter. For the gesture to be considered a two digit, parallel touch gesture, for example, the change in distance between the digits must be smaller than a defined threshold throughout the execution of the gesture.

A developer may further define the parameters of a new touch gesture through various mechanisms of the gesture development interface. For example, the developer may select check boxes or drop-down menu entries to indicate that a particular parameter is not applicable to the description of a new touch gesture. In other embodiments, other mechanisms of a user interface may be employed for receiving developer input that further describes a new touch gesture. The gesture parameters specified in the gesture development interface, as described above, may override or may be used in combination with the gesture parameters captured from multiple physical executions of a new touch gesture. In some embodiments, a developer may define the parameters of a gesture through various mechanisms of the gesture development interface. For example, the developer may select check boxes or drop-down menu entries to indicate that a particular parameter is not applicable to the description of a new touch gesture. In other embodiments, other mechanisms of a user interface may be employed for receiving developer input that further describes a new touch gesture.

The gesture development tool may automatically determine that certain parameters of a new touch gesture executed by a developer may not be applicable to the definition of the new touch gesture. For example, for a new touch gesture in which the standard deviation of a parameter is above a certain threshold (e.g., all iterations of the parameter are so far apart that they may be considered outliers), the gesture development tool may determine that the parameter may not be applicable to the definition of the new touch gesture. For example, a developer executing multiple iterations of a new touch gesture may execute the gesture in different areas on the surface of the touch-enabled device in order to teach the gesture development tool that the location of new touch gesture is not an applicable parameter. The gesture development tool may recognize the large deviation in the location parameter of the executed touch gesture and may suggest to the developer, via the user interface, that the location parameter is not applicable to the definition of the new touch gesture. The developer may then confirm for the gesture development tool that the location parameter is not applicable to the gesture definition.

In other embodiments, a developer may input a new touch gesture to the gesture development interface using a gesture definition language. The gesture definition language, in some embodiments, may which contain graphical elements that represent various touch gesture parameters. The gesture definition language may, for example, contain a set of icons, with each icon representing a gesture parameter or characteristics of a gesture parameter. For example, an icon depicting an upward-facing arrow may represent an upward trajectory for a touch gesture motion. The gesture definition language may also contain various other graphical representations of touch gesture parameters. For example, the gesture definition language may contain various curves and lines that a developer may combine to form a new touch gesture. The gesture definition language may also contain a free-form drawing interface in which a developer can input a new touch gesture by drawing the new touch gesture in the gesture development interface.

In a manner analogous to musical notation, the graphical elements of the gesture definition language may be various symbols (e.g., icons and/or other representations as described above) placed on a timeline. As with musical notes depicted in sheet music, the elements of the gesture definition language may be presented on the timeline in a manner that represents the relative timing of the multiple gesture parameters that form a complete gesture. For example, a symbol on a timeline may indicate that a particular parameter of a gesture (e.g., one finger down at a particular set of coordinates) occurs for a certain amount of time (e.g., one to two seconds). In such an example, the timeline of the gesture definition language may further indicate that a next gesture parameter (e.g., a horizontal swipe of the finger) may occur a certain amount of time (e.g., two to three seconds) after the preceding parameter. In some embodiments, a symbol representing a touch gesture parameter may include modifiers which provide further description, or specific characteristics, of the touch gesture parameter represented by the symbol. For example, analogous to a "#" sign indicating that a musical note is "sharp," a symbol may include a modifier which indicates a particular characteristic of a touch gesture parameter. In some embodiments, a developer may compose the timeline of symbols and modifiers representing the parameters of a gesture in the gesture development interface of the gesture development tool.

In other embodiments, the gesture definition language may be a written, textual language with elements that represent various touch gesture parameters. The written language used to represent a touch gesture may contain a set of keywords, with each keyword representing a gesture parameter or characteristics of a gesture parameter. The written language may also contain symbols which represent the timeline of a gesture. For example, symbols may be used to specify the beginning, end and in-between states of a gesture. A touch gesture represented by a written, textual language may contain a group of keywords that define the touch gesture and symbols that represent the timeline of the gesture. As an example, a keyword such as "horizontal" may represent a touch gesture that is a straight line formed in a horizontal direction across the surface of a touch-enabled device. The written language used to represent a touch gesture may also contain modifiers which may provide further description of a touch gesture parameter. For example, a modifier such as "L-R" when applied to the keyword "horizontal," may represent a touch gesture that is a horizontal line formed from left to right across the surface of a touch-enabled device. In this example, "L" may be a symbol identifying the beginning of the touch gesture and "R" may be a symbol identifying the end of the touch gesture.

In some embodiments, the method for developing custom touch gestures may also include receiving "negative" user input which specifies parameters that are not part of a new custom touch gesture. Such "negative" user input may be counterexamples, i.e., touch gestures that a user may specify are not equivalent to a custom touch gesture. The gesture development tool interface may provide a mechanism for a user to input negative examples of a new custom touch gesture to specify touch gestures and/or parameters that are not equivalent to the new custom touch gesture. Such user input may be used as negative reinforcement for the gesture development tool. More specifically, the user may teach the gesture development tool parameters that are not equivalent to a new custom touch gesture, in addition to teaching the gesture development tool parameters that are equivalent to a new custom touch gesture. The user interface of the gesture development tool may provide mechanisms similar to those described above for the user to input the negative touch gesture parameters. A user may provide such negative touch gesture parameters to the gesture development tool to further define touch gestures that may potentially be ambiguous or difficult to distinguish from similar touch gestures.

The gesture development tool may also provide a mechanism for a developer to further characterize a new touch gesture in terms of the timeline of the touch gesture. For example, the timeline of a new touch gesture may include timeframes that are insignificant to the definition of the gesture. Such insignificant timeframes may be, for example, variable length pauses that occur in the timeline. The gesture development tool may provide a mechanism by which the developer may indicate the insignificant timeframes. As an example, a touch gesture may be executed by a user putting a first digit down on the touch-enabled surface and then sliding a second digit up and down on the surface. The gesture may be valid with various delay lengths between the touch of the first digit and the touch of the second digit. In the gesture development interface, the developer may be able to mark a sequence of timeframes as insignificant within the timeline of the gesture. Accordingly, the insignificant timeframes may not be used by the gesture development tool to define the new touch gesture. For example, the "first digit down/second digit sliding up and down" gesture may be defined independent of the amount of delay between the first digit touch and the second digit touch.

A developer that has described the parameters of a new touch gesture using a gesture definition language, may want to see a visual representation of the gesture that has been defined using the gesture definition language. The gesture development tool may provide an option for the developer to request such a visual representation of the new touch gesture. When such an option is selected by the developer (e.g., by selecting a "Show Gesture" button) the gesture development tool may interpret the timeline, symbols and modifiers of the gesture definition language to determine the parameters of the new touch gesture and display the new touch gesture in the gesture development user interface. Such a visual representation of the new touch gesture may provide feedback to the developer indicating whether the definition of a new touch gesture has resulted in the intended touch gesture.

The visual representation of a new touch gesture, in some embodiments, may be a still image, illustrating the completed new touch gesture as applied to the surface of a touch-enabled device. For example, the gesture development interface may display the touch points, position, and shape of the completed form of the new touch gesture. In other embodiments, the visual representation of a new touch gesture may be an animated representation which may be a "replay" of the new touch gesture as it is formed on the surface of a touch-enabled device. To generate an animated representation of a new touch gesture, the gesture development tool may analyze the timing parameters and characteristics represented in the gesture description language and execute the new touch gesture as specified by such timing parameters and characteristics. An animated visual representation of a new touch gesture may allow the developer to view additional parameters of the new touch gesture that may not be apparent in a still image of the new touch gesture, such as the speed and timing of the new touch gesture.

Subsequent to completing the entry of gesture parameters that describe a new touch gesture in a gesture development interface (using one of the methods described above) the developer may indicate to the gesture development tool that the touch gesture entry is complete. For example, the developer may select a "Gesture Complete" button in the gesture development interface. In embodiments in which a new touch gesture is input via repetitive execution of the new touch gesture, as described above, a developer may indicate the new touch gesture entry is complete after executing the new touch gesture a desired number of times. As an alternative in such an embodiment, the gesture development tool may determine when the new touch gesture entry is complete, as described above, without indication from the developer that the new touch gesture entry is complete. For example, the gesture development tool may determine that the new touch gesture entry is complete after a specified number of repetitive inputs of the new touch gesture have been received or after a specified number of repetitive inputs with a certain standard deviation (as described above) have been received. In such an example, the gesture development tool may notify the developer that the new touch gesture has been accurately captured and that repetitive executions of the new touch gesture are no longer necessary.

Subsequent to determining that the new touch gesture entry is complete, or receiving an indication that the touch gesture entry is complete, the gesture development interface may provide an interface for a developer to enter a label associated with a new touch gesture. For example, the developer may assign a label of "upper left tap" to a quick, one digit touch to the upper left corner. As another example, the developer may assign a label of "L-R horizontal swipe" to a new touch gesture executed by two digits moving left to right across the central region of the surface of a touch-enabled device. The gesture development interface may provide a variety of mechanisms by which the developer may input the touch gesture label. For example, the developer may choose a label from a predefined set of labels by selecting an entry in a drop down menu. As another example, the developer may assign a custom label to the new touch gesture by entering text into a text box of the gesture development interface. In other embodiments, combinations of the above label entry mechanisms or other label entry mechanisms may be provided by the gesture development interface.

The gesture development tool may create a gesture descriptor that represents the parameters of a new touch gesture, as indicated in 202 of FIG. 2. The gesture descriptor may be a unique representation of the new touch gesture. The gesture descriptor representing the parameters of a new touch gesture may be generated by the gesture development tool based on the parameters that describe the new touch gesture. Examples of parameters that may describe a touch gesture may include, but are not limited to: number of digits used, touch points (i.e., coordinate positions of the digits), relative distance between touch points, trajectory of each touch point, amount of pressure applied at each touch point, speed of trajectories (i.e., speed of the gesture's motion), area of contact of each touch point, timeline (i.e., beginning, progression and end of the gesture), and scale (e.g. the radius of a circular gesture).

As described above, the parameters of a touch gesture may represent the characteristics of the touch gesture over time. For example, the parameters may be represented on a timeline with multiple frames, where each frame indicates the value of a parameter at a particular point in time during the execution of the gesture. Each parameter may be a set of values that represent the values of a parameter over time. For example, the touch gesture labeled "L-R horizontal swipe", as mentioned above, may be described by the following parameters: two digits, left to right motion, coordinates of each digit throughout the motion of the gesture, and time elapsed from start to finish of the motion. "L" may indicate the beginning of the touch gesture on the timeline and "R" may indicate the end of the touch gesture on the timeline, with "L-R" indicating that the gesture motion is from left to right during the execution of the gesture Based on the values of each of these parameters, the gesture development tool may generate a gesture descriptor representing the "L-R horizontal swipe" touch gesture.

A gesture descriptor may be formed by the gesture development tool as a software vector structure, where each element of the vector may be a set of values representing a particular parameter of a new touch gesture over time. The set of values representing the timeline of a new touch gesture may also be implemented as a vector. The gesture development tool may create a software recognizable representation of each parameter value and store each representation in a designated element of the vector. As an example, element 0 of a gesture descriptor vector may represent the "number of digits used" parameter of a new touch gesture. Element 0 may contain a vector of values that represent the values of the "number of digits" parameter over time. For example, the vector contained in element 0 may hold values of 1 and 2, indicating that the touch gesture begins with one digit and ends with two digits.

A gesture descriptor vector may have one or more designated elements for each parameter that may be included in the set of parameter describing a touch gesture. A gesture descriptor vector, in some embodiments, may contain sufficient information representing the parameters of the gesture such that the gesture may be fully reconstructed by the gesture development tool using the parameter values contained in the gesture descriptor. For new touch gestures which contain multiple "analog" output parameters (described above), various embodiments of the gesture descriptor may contain data from different information channels associated with the new touch gesture. For example, one embodiment of the gesture descriptor may contain only the first information channel, while another embodiment may contain all of the information channels, while another embodiment may contain a combination of the information channels.

In some embodiments, the gesture descriptor representing a new touch gesture may be an "ideal" representation of the gesture. The gesture development tool may smooth out the lines or curves of a new touch gesture provided by a developer's physical execution of the new touch gesture on a touch-enabled device. For example, a developer drawing a circle on a touch-enabled device is unlikely to draw a perfect circle with a consistent radius. In such an example, the gesture development tool may recognize the developer input as a circle, via repetitive input as described above, and create an ideal representation of the gesture that is a circle with a consistent radius. The gesture development tool may create the ideal representation of a new touch gesture by adjusting the parameters of the gesture that specify the position, or coordinates, of the gesture. For example, the gesture development tool may adjust the positional parameters of a new touch gesture to fit a smooth curve. In some embodiments, the gesture development tool may create a Bezier approximation of the lines and/or curves of a new touch gesture. In other embodiments, other approximation or smoothing methods or algorithms are possible. The gesture development tool may create a gesture descriptor, as described above, using the adjusted positional parameters of the new touch gesture.

In embodiments in which a new touch gesture has been input to the gesture development tool via user execution of the new touch gesture on a touch-enabled device, the gesture development tool may analyze the parameters of the executed gesture, the adjusted parameters (i.e., the ideal representation, as described above), and (if available) any additional user parameter characteristics entered via the gesture development interface (as described above) to create the gesture descriptor. For example, the gesture development tool may determine the timing and/or speed of the new touch gesture from the parameters of the executed gesture and may determine the coordinates and trajectory of the new touch gesture from the ideal representation of the new touch gesture. Using a combination of these parameters, the gesture development tool may create a gesture descriptor that represents the new touch gesture. In other embodiments in which a new touch gesture has been provided to the gesture development tool by way of a gesture definition language, as described above, the gesture development tool may extract the values of the gesture parameters from the gesture definition language and enter the values into the designated elements of the gesture descriptor vector, as described above.

The gesture development tool may provide an option for a developer to test a gesture descriptor. For example, a developer may be able to choose an option in the gesture development interface to test the gesture descriptor (e.g., by selecting a "Test Gesture" button). In response to receiving a request to test a gesture descriptor, the gesture development tool may extract the parameter values from the gesture descriptor vector and use the parameter values to generate the touch gesture defined by the parameter values. The gesture development tool may present a visual representation of the generated touch gesture to the developer. The visual representation, which may be a still or animated image of the touch gesture, may be presented to the developer in a manner similar to that described above. The visual representation of the touch gesture may allow a developer to determine whether the new touch gesture has been accurately captured by the gesture development tool. If the developer is satisfied with the visual representation of the new touch gesture, the developer may indicate to the gesture development tool that the new touch gesture is correct (e.g., by selecting a "Gesture Correct" button in the gesture development interface). Otherwise, the developer may repeat one of the methods described above to input new or adjusted gesture parameters in order to correct the gesture development tool's representation of the new touch gesture.

In some embodiments, the gesture development tool may compare a newly created gesture descriptor to an existing set of gesture descriptors. The comparison may be performed by classifier module 108 of the gesture development tool. The gesture development tool may perform the comparison to determine whether a new touch gesture may be too similar to a previously defined touch gesture. Touch gestures that are very similar (i.e., have closely matched gesture descriptors) may be "ambiguous" gestures. More specifically, it may be very difficult to distinguish between the touch gestures. Touch gestures that are difficult to distinguish may lead to errors or misinterpretation of user intentions, as one touch gesture may easily be interpreted as another touch gesture by a gesture classifier. The gesture development tool may provide an alert to the developer when the gesture descriptor for a new touch gesture is very similar to an existing touch gesture. The alert to the developer may indicate to the developer that the new touch gesture may be "ambiguous." The gesture development tool may provide the developer an option to further distinguish the new touch gesture by changing or adding gesture parameters, or re-entering the new touch gesture.

The gesture development tool may create a unique identifier for a gesture descriptor. For example, the gesture development tool may apply a hash function to the gesture descriptor to create the unique identifier. Such an identifier may be a compressed representation of the gesture descriptor; for example, a 128-bit data element that may provide a convenient means for representing the gesture descriptor. Various hash algorithms may be applied to the gesture descriptor in different embodiments to create the unique identifier.

The gesture development tool may also calculate a tolerance range for each parameter of a new touch gesture. In some embodiments, a tolerance range may specify the range within which the value of a parameter may be matched. For example, a parameter of a new touch gesture may be considered a match to a corresponding stored parameter of an existing gesture if the value of the new parameter is within the tolerance range of the stored parameter. As an example of a tolerance range, the gesture development tool may determine that a new touch gesture's elapsed time must be within +/−10% of an existing gesture's elapsed time in order to consider the elapsed time of the two gestures equivalent. The gesture development interface may provide various mechanisms for a developer to input tolerance ranges for the parameters defining a new touch gesture. For example, the gesture development interface may provide a slider mechanism for one or more parameters that may allow the developer to adjust the tolerance range for each of the parameters by moving the slider to a particular position along a scale. The tolerance range for each parameter may vary between parameter types and may vary from embodiment to embodiment. For gesture parameters that are marked as not applicable to the definition of a new tough gesture, as described above, the tolerance level may be set at 100%.

As indicated at 204 of FIG. 2, the gesture descriptor may be stored by the gesture development tool in a data set accessible by a software application. Each new touch gesture that is defined by a developer in a manner similar to the methods described above may be stored in the same data set, thus creating a set of custom touch gestures that may be used by a software application. In some embodiments, the data set containing the set of custom touch gestures may be embedded in a software application. In other embodiments, the data set containing the set of custom touch gestures may be stored as a stand-alone gesture library module accessible by one or more software applications. As described in further detail below, the data set may enable the software application to correctly interpret new touch gestures that are applied to a user interface of the software application via a touch-enabled device.

In some embodiments, the gesture development tool may construct the data set of gesture descriptors such that software application developers without access to the gesture development tool may make limited modifications to the set of touch gestures by directly modifying the gesture descriptors. For example, software application developers may modify the tolerance range (described above) for a touch gesture to customize the touch gesture for use within a particular application. For example, a software application developer may wish to widen the tolerance range for a certain touch gesture within the particular software application to make the touch gesture less sensitive. In some embodiments, the gesture development tool may provide an option for a developer to allow an end user to modify the sensitivity (i.e., tolerance range) of touch gestures within a software application. For example, a user with motor coordination difficulties may wish to decrease the sensitivity of the set of touch gestures within a software application.

The gesture development interface may provide an interface in which a developer may enter a software command that is associated with a new touch gesture, as indicated at 206 of FIG. 2. For example, the developer may choose a command from a predefined set of commands by selecting an entry of a drop down menu. The predefined set of commands included in the menu may be the set of user interface commands that are available in the software application for which the new touch gesture is being designed. The set of commands may include "one-shot" commands which may require a single, simple input from a user; for example, a command such as "Open file." The set of commands may also include continuous commands which may require multiple, or extended, user inputs; for example, a command to "Rotate" an object. In other embodiments, other methods for entering a software command associated with a new touch gesture may be used. A developer may indicate that entry of the software command is complete, for example, by selecting a "Command Entry Complete" button in the gesture development interface.

As indicated at 208 of FIG. 2, the gesture development tool may store the unique identifier of the gesture descriptor with the gesture descriptor, as described above. The gesture development tool may also store the determined tolerance range (as described above) for each parameter of a touch gesture with the gesture descriptor. The gesture development tool may also store the software command associated with the gesture descriptor, as indicated at 208 of FIG. 2. The software command may be stored with the gesture descriptor or stored in a separate data set which is accessible by a software application.

A gesture development tool may be implemented in any authoring application, including but not limited to Adobe® Flash Professional®, Abode® Flash Builder®, or Adobe® Flash Catalyst®. A gesture development module may, for example, be implemented as a stand-alone gesture development application, as a module of a gesture development application such as Adobe® Flash Professional®, Abode® Flash Builder®, or Adobe® Flash Catalyst®, as a plug-in for applications including image editing applications such as Adobe® Flash Professional®, Abode® Flash Builder®, or Adobe® Flash Catalyst®, and/or as a library function or functions that may be called by other applications. Note that Adobe® Flash Professional®, Abode® Flash Builder®, or Adobe® Flash Catalyst® are given as examples, and are not intended to be limiting.

Classifying Touch Gestures

As described above, embodiments of the system for developing and classifying touch gestures may implement a touch gesture classification method which may be used to recognize new touch gestures and determine associated commands or actions to take in response to receiving a new touch gesture. Embodiments of a touch gesture classification method, which may be implemented as or in a tool, module, plug-in, stand-alone application, etc., may translate touch gestures applied by a user to the interface of a software application to commands that are executable by the software application. For simplicity, implementations of embodiments of the touch gesture classification method described herein will be referred to collectively as a gesture classification module. Embodiments may be applied in one or more of, but not limited to, graphic design, 3D modeling, photo manipulation, enhancement and authoring tools, window management, code navigation, and video editing.

Figure 4:
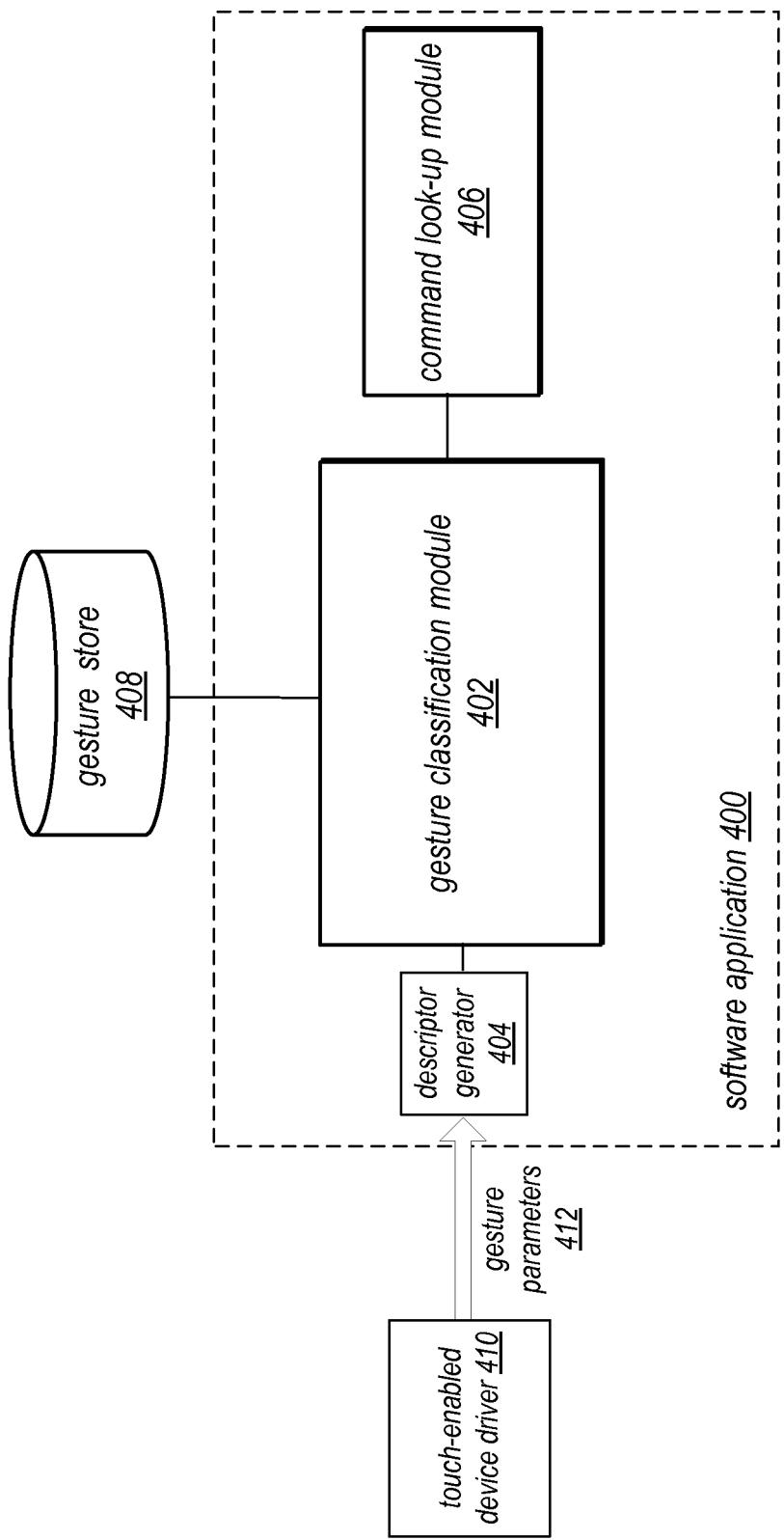
FIG. 4 illustrates an example of a gesture classification module which may be used to translate touch gestures into software commands, according to some embodiments.

FIG. 4 illustrates an example of a gesture classification module which may be used to recognize new touch gestures and determine associated commands or actions to execute in response to receiving a new touch gesture. As illustrated in FIG. 4, descriptor generator 404 of software application 400 may receive gesture parameters 412 from touch-enabled device driver 410. Gesture parameters 412 may represent user entry of a new touch gesture indicating a command or action to be performed by software application 400. Descriptor generator 404 may create a gesture descriptor based on gesture parameters 412 and provide the gesture descriptor to gesture classification module 402. Gesture classification module 402, may search gesture store 408 for existing gesture descriptors that match the gesture descriptor received from descriptor generator 404. Gesture classification module 402 may return, to software application 400, unique identifiers of any matching existing gesture descriptors located in gesture store 408. The matching existing gesture descriptors may be ranked according to a "closest match" function which calculates the accuracy with which an existing touch gesture matches a new touch gesture entered by a user of software application 400. Software application 400 may access command look-up module 406 to locate commands associated with the unique identifiers and may then perform the associated commands. Gesture development module 402, descriptor generator 404, and command look-up module 406 may be embedded in software application 400 as illustrated in FIG. 4. In other embodiments, gesture development module 402, descriptor generator 404, and/or command look-up module 406 may be plug-ins or stand alone applications, or other entities separate from software application 400, but accessible by software application 400.

Figure 5:
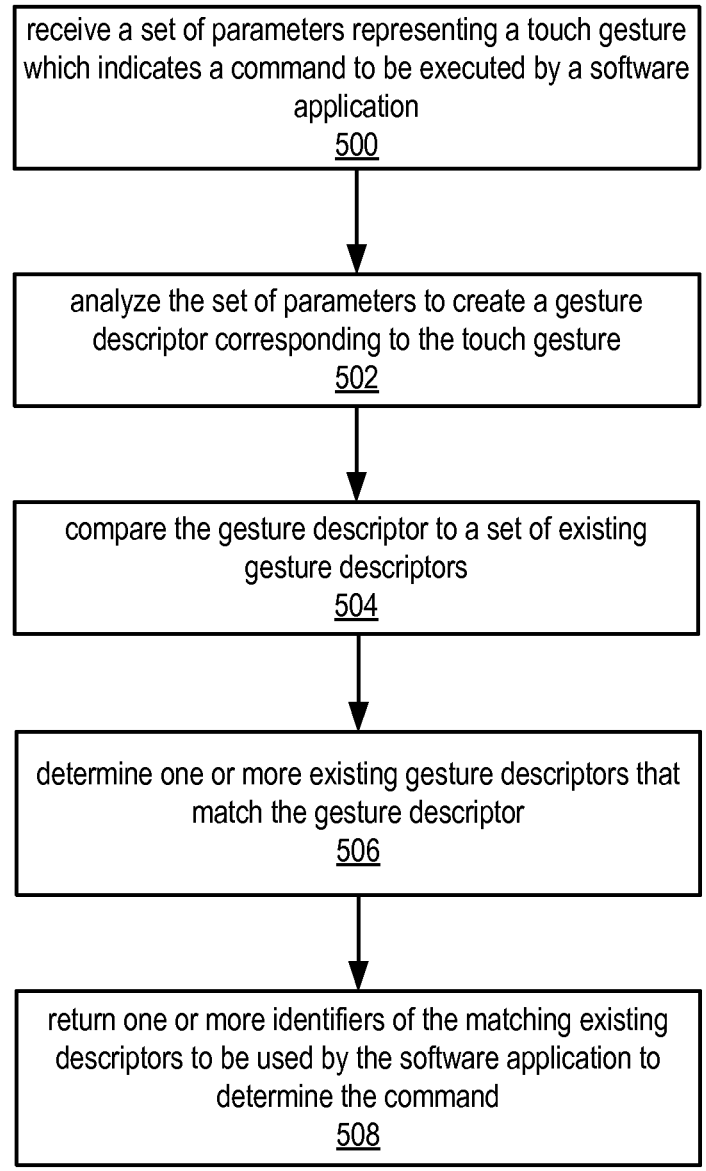
FIG. 5 is a flowchart of a general method for recognizing a new touch gesture and determining software commands or actions associated with the new touch gesture according to some embodiments.

FIG. 5 is a flowchart of a general method for recognizing a new touch gesture and determining software commands or actions associated with the new touch gesture according to some embodiments. The method may, for example, be implemented in a gesture classification module. As indicated in 500, the method may include receiving a set of parameters that represent a touch gesture which indicates a command to be executed in a software application. The set of parameters of a touch gesture applied to a touch-enabled device may be received by the gesture classification module from the device driver for the touch-enabled device or the operating system on which the software application is executing.

As indicated at 502, the descriptor generator may analyze the set of parameters to create a gesture descriptor corresponding to the touch gesture. As described above, the gesture descriptor may be a unique representation of the parameters of the touch gesture. The descriptor generator may extract the parameters of the gesture from the received touch gesture data and create the gesture descriptor based on the extracted parameters. Examples of parameters that may describe a touch gesture may include, but are not limited to: number of digits used, touch points (i.e., coordinate positions of the digits), relative distance between touch points, trajectory of each touch point, amount of pressure applied at each touch point, speed of trajectories (i.e., speed of the gesture's motion), area of contact of each touch point, timeline (i.e., beginning, progression and end of the gesture), and scale (e.g. the radius of a circular gesture). For example, the touch gesture labeled "L-R horizontal swipe", as mentioned above, may be described by the following parameters: two digits, left to right motion, coordinates of each digit throughout the motion of the gesture, and time elapsed from start to finish of the motion. Based on the values of each of these parameters, the gesture development tool may generate a gesture descriptor representing the "L-R horizontal swipe" touch gesture. As described above, the parameters of a touch gesture may represent the characteristics of the touch gesture over time. For example, the parameters may be represented on a timeline with multiple frames, where each frame indicates the value of a parameter at a particular point in time during the execution of the gesture.

A gesture descriptor may be formed by the descriptor generator as a software vector structure, where each element of the vector may be a set of values representing a particular parameter of a new touch gesture over time. The gesture descriptor created by the descriptor generator is similar to the gesture descriptor created by the descriptor generator of the gesture development tool (as described above) and is created in a similar manner. The set of values representing the timeline of a new touch gesture may also be implemented as a vector. The descriptor generator may create a software recognizable representation of each gesture parameter and store each representation in a designated element of the vector. As an example, element 0 in the gesture descriptor vector may contain a vector of values that represent the values of the "number of digits" parameter over time. For example, the vector contained in element 0 may hold values of 1 and 2, indicating that the touch gesture begins with one digit and ends with two digits. In some embodiments, for new touch gestures which contain multiple "analog" output parameters (described above), the gesture descriptor may contain data from different information channels associated with the new touch gesture. For example, one embodiment of the gesture descriptor may contain only the first information channel, while another embodiment may contain all of the information channels, while another embodiment may contain a combination of the information channels.

As indicated in 504 of FIG. 5, the gesture classification module may compare the gesture descriptor (i.e., the gesture descriptor corresponding to the touch gesture entered by a user) to a set of existing gesture descriptors. As described above, existing gesture descriptors and software commands corresponding to the gesture descriptors may be stored in one or more data sets accessible by a software application. In some embodiments, the data set containing the set of existing gesture descriptors may be embedded in the software application. In other embodiments, the set of existing gesture descriptors may be stored as a stand-alone gesture library module accessible by one or more software applications.

As described above, the types of touch gesture characteristics supported by touch-enabled devices may vary between different types of devices. For example, some touch-enabled devices may support a set of common touch gesture characteristics such as touch point location, speed and direction. As described above, custom touch gestures may be defined by a set of common gesture characteristics and/or extended gesture characteristics. Touch gestures applied to a touch-enabled device which supports a common set of gesture characteristics may provide only common gesture characteristics to the gesture classification module for inclusion in a gesture descriptor. Accordingly, the gesture classification module may compare the gesture descriptor to only the set of common gesture characteristics defined for each existing gesture descriptor. Touch gestures applied to a touch-enabled device which supports an extended set of gesture characteristics may provide extended gesture characteristics to the gesture classification module for inclusion in a gesture descriptor. Accordingly, the gesture classification module may compare the gesture descriptor to the set of extended gesture characteristics defined for each existing gesture descriptor.

As indicated in 506 of FIG. 5, the gesture classification module may determine one or more existing gesture descriptors that match the gesture descriptor. As described above, each existing gesture descriptor may be stored with data indicating a tolerance range for each parameter of the gesture. As described above, a tolerance range may specify the range within which the value of a parameter may be matched. For example, a parameter of a new gesture descriptor may be considered a match to a corresponding parameter of an existing gesture descriptor if the value of the parameter of the new gesture descriptor is within the tolerance range of the corresponding parameter of the existing descriptor. The gesture classification module may compare the gesture descriptor to an existing gesture descriptor by comparing the elements of the gesture descriptor vector to the elements of the existing gesture descriptor vector. A parameter of a new gesture descriptor may be considered "matched" to a corresponding parameter of an existing gesture descriptor if the value of the vector element corresponding to the parameter of the new gesture descriptor is within the tolerance range defined for the corresponding parameter of the existing gesture descriptor. For example, the vector element corresponding to the scale parameter of a new circular gesture may indicate that the radius of the new circular gesture is 1.25 inches. The vector element corresponding to the scale parameter of an existing circular gesture may indicate that a tolerance range is 1 to 1.75 inches. In this example, the scale parameter of the new circular gesture would be considered "matched" to the scale parameter of the existing gesture since 1.25 inches (i.e., the scale parameter of the current gesture) is within the range of 1 to 1.75 inches (i.e., the tolerance range of the scale parameter of the existing gesture).

The gesture classification module may compare each element of the new gesture descriptor vector to each element of an existing gesture descriptor vector to determine which parameters, if any, between the two gesture descriptors are "matched." The gesture classification module may, in some embodiments, determine whether a new gesture descriptor matches an existing gesture descriptor dependent on the matching parameters between the two gesture descriptors. The criteria that may be used by the gesture classification module to determine whether a new gesture descriptor matches an existing gesture descriptor may vary from embodiment to embodiment. For example, in one embodiment a new gesture descriptor may be considered a match to an existing gesture descriptor if 75% of the new gesture descriptor parameters are within a tolerance range of the corresponding parameters of the existing gesture descriptor. While, in another embodiment, a new gesture descriptor may be considered a match to an existing gesture descriptor if 90% of the new gesture descriptor parameters are within a tolerance range of the corresponding parameters of the existing gesture descriptor. In other embodiments, certain parameters of a gesture descriptor may be considered dominant parameters and may be more heavily weighted than other parameters for the purposes of determining whether two gesture descriptors are equivalent. For example, in some embodiments, two gesture descriptors may be considered equivalent if 90% of the dominant parameters are similar.

As described above, the parameters of a touch gesture may represent the characteristics of a parameter over time. For example, the parameters may be represented on a timeline with multiple frames, where each frame may indicate the value of a parameter at a particular point in time during the execution of the gesture. A parameter element in a gesture descriptor may be a timeline vector which contains a set of values that represent the values of the parameter over time. The gesture classification module may compare the timeline vectors for two gesture parameters to determine whether the parameters are matched. The gesture classification module may use a method similar to that described above, in which elements of two timeline vectors are compared to determine whether the elements of the new gesture's timeline vector are within the tolerance range of the elements of the existing gesture's timeline vector. The gesture classification module may use such a method to determine whether the timing of two gesture parameters is equivalent.

The gesture classification module may exclude, from the vector comparison, elements of a timeline vector which have been marked as not applicable (i.e., the tolerance of the element is 100%). In some embodiments, as described above, a touch gesture parameter may be function of a particular parameter over time. In such embodiments, the gesture classification module will calculate the parameter to determine whether a match exists between two gesture descriptors. For example, the gesture classification module may consider how the difference between elements of two timeline vector from two different gestures changes over time, rather than considering the actual value of the difference, as in the example of the two digit parallel swipe described above.

In other embodiments, the gesture classification module may determine whether an existing gesture descriptor matches the new gesture descriptor by computing an overall "distance" between the parameters. For example, the gesture classification module may compute a Euclidean distance between the two descriptors. The Euclidean distance ($d_{ij}$) between a new gesture descriptor i and an existing gesture descriptor/may be computed as in equation (1):

$$d_{ij} = \sqrt{\sum_{k=1}^{n} (x_{ik} - x_{jk})^2} \qquad (1)$$

for n number of parameters x. The gesture classification module may determine whether the new gesture descriptor and existing gesture descriptor are a match based on the value of the Euclidean distance ($d_{ij}$) between the two descriptors. For example, if the distance between the two gesture descriptors is below a certain threshold, the gesture descriptors may be considered matched. The distance threshold below which two gesture descriptors may be considered a match may vary from embodiment to embodiment.

As described above, each existing gesture descriptor may be stored with a unique identifier that serves as a compressed representation of the gesture descriptor. The unique identifier corresponding to each matching existing gesture descriptor may be returned to the software application by the gesture classification module, as indicated in 508 of FIG. 5. In some embodiments, the gesture classification module may return the unique identifier corresponding to the existing gesture descriptor determined to be the closest match to the new gesture descriptor (i.e., having the shortest distance from the new gesture descriptor), out of all of the existing gesture descriptors, to the new gesture descriptor. In some embodiments, the gesture classification module may use the k-nearest neighbors algorithm to determine the existing gesture descriptor that is the closest match to the new gesture descriptor. The software application may determine whether the command associated with the unique identifier is appropriate within the current context of the software application. If the command is not appropriate for execution based on the current context of the software application, the application may return an error to the gesture classification module.

In some embodiments, the gesture classification module may return, to the software application, along with the unique identifier, an indicator of the gesture classifier module's confidence that the gesture descriptor corresponding to the unique identifier is an accurate match to the new gesture descriptor. For example, if 90% of the parameters of the existing gesture descriptor match the parameters of the new gesture descriptor, the gesture classification module may indicate to the software application a confidence value of 90%. In other embodiments, other algorithms for determining the confidence value of the gesture classification module and other means for representing the confidence value may be employed.

In some embodiments, the gesture classification module may return one or more unique identifiers to the software application. For example, the gesture classification module may send unique identifiers corresponding to the top three matching gesture descriptors from the set of existing gesture descriptors. As another example, the gesture classification module may send unique identifiers for all existing gesture descriptors that are within a certain threshold distance of the new gesture descriptor. In some embodiments, the gesture classification module may send the unique identifiers to the software application as a ranked set of unique identifiers. For example, the gesture classification module may rank the unique identifier corresponding to the best matched gesture descriptor as first, the unique identifier corresponding to the second best matched gesture descriptor as second, and so forth. In some embodiments, the gesture classification module may also indicate the confidence value of each of the unique identifiers, as described above. If no matching gesture descriptors are found in the set of existing gesture descriptors, the gesture classification module may not return any unique identifiers to the software application and may return an error message to the software application indicating that the new touch gesture was not recognized.

The software application may use the unique identifier of a matched gesture descriptor to retrieve the software command corresponding to the new gesture descriptor. For example, the software application may access a command table that maps gesture descriptor identifiers to software commands and use the unique identifier to look up the command associated with the identifier. As another example, the software application may look up a pointer indicating the location of the associated software command and may use the pointer to access the software command.

The software application, as described above, may receive, from the gesture classification module, several unique identifiers representing several matched existing gesture descriptors. In this case, the software application may retrieve a software command, using a method similar to those described above, corresponding to each received unique identifier. The software application may then determine, based on the current context of a user's activities within the software application, the software command that best matches the user's touch gesture entry. As an example, each entry in the command table described above may also include software application context information. For example, a unique identifier representing a gesture descriptor may have more than one entry in the command table. Each entry may correspond to a different software command and may include different context information. The software application may retrieve all command table entries corresponding to a unique identifier and then select the software command included in the entry that matches the current context of the software application. In some embodiments, a gesture descriptor may contain multiple touch gestures, each representing a different command, which may be performed simultaneously by a user. For example, as described above, a user may execute zoom, rotate and pan commands simultaneously on a digital image. The software application may retrieve all commands associated with the multiple, simultaneous touch gestures and enable the user to execute the command simultaneously.

A gesture classification module may be implemented in any runtime application, including but not limited to Adobe® Photoshop®, Adobe® Flash Player® or Abode® AIR®. A gesture classification module may, for example, be implemented as a stand-alone gesture classification application, as a module of a runtime application such as Adobe® Photoshop®, Adobe® Flash Player® or Abode® AIR®, as a plug-in for applications including image editing applications such as Adobe® Photoshop®, Adobe® Flash Player® or Abode® AIR®, and/or as a library function or functions that may be called by other applications. Note that Adobe® Photoshop®, Adobe® Flash Player® or Abode® AIR® are given as examples, and are not intended to be limiting.

Example System

Figure 6:
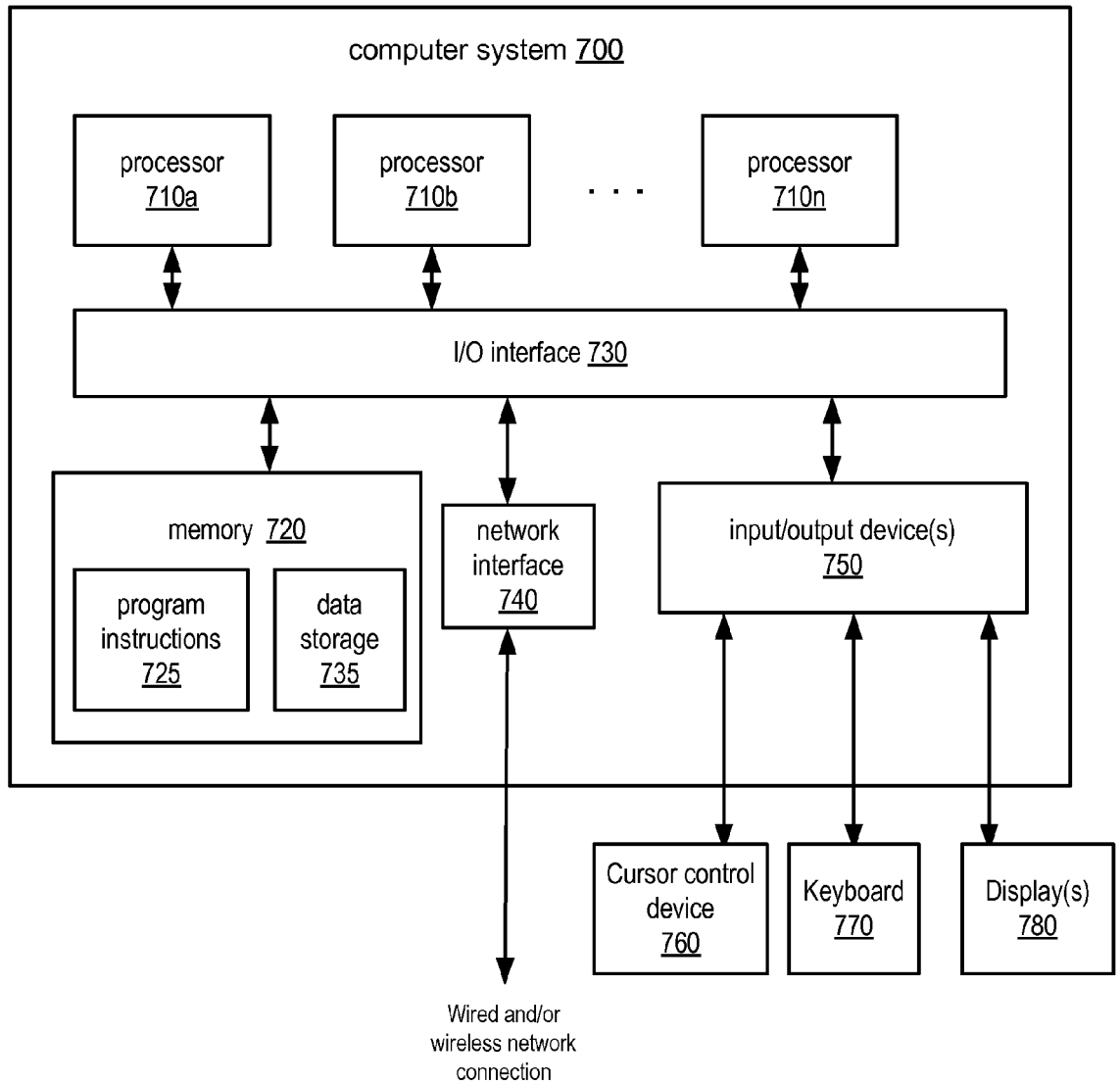
FIG. 6 illustrates an example computer system that may be used in embodiments.

Embodiments of a touch gesture development module and/or a touch gesture classification module as described herein may be executed on one or more computer systems, which may interact with various other devices. One such computer system is illustrated by FIG. 6. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, display(s) 780, and touch-enabled device(s) 790. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a touch gesture development module and a touch gesture classification module are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 24, memory 720 may include program instructions 725, configured to implement embodiments of a touch gesture classification module as described herein, and data storage 735, comprising various data accessible by program instructions 725. In one embodiment, program instructions 725 may include software elements of embodiments of a touch gesture classification module as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a touch gesture classification module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
performing a definition process for defining a touch gesture based on a user's repeatedly physically executing the same touch gesture on a touch-enabled device, wherein each iteration of said repeatedly physically executing the same touch gesture comprises:
capturing a plurality of parameters of the touch gesture based on user input physically applied by the user to a touch-sensitive surface of the touch-enabled device to define the touch gesture, wherein each captured parameter of the plurality of captured parameters represents a characteristic of the touch gesture and includes values captured at particular points in time during the iteration;
generating a descriptor for the touch gesture, wherein the descriptor is a representation of the pluralities of parameters captured from the user input during the iterations of said repeatedly physically executing the same touch gesture;
storing the descriptor;
associating the descriptor for the touch gesture with a command to be executed in response to receiving the touch gesture; and
storing the descriptor and an association of the touch gesture with the command.

2. The method of claim 1, further comprising:
receiving user input indicating a start of the touch gesture definition process.

3. The method of claim 2, further comprising receiving an indication from the user that said repeatedly physically executing the same touch gesture is complete prior to said generating the descriptor.

4. The method of claim 1, further comprising:
indicating to the user whether a sufficient number of the iterations of said repeatedly physically executing the same touch gesture has been performed to define the touch gesture; and
wherein said generating the descriptor is performed in response to determining that a sufficient number of the iterations of said repeatedly physically executing the same touch gesture has been performed to define the touch gesture.

5. The method of claim 1, wherein the descriptor for the touch gesture is based on a combination of parameters from the pluralities of parameters.

6. The method of claim 1, wherein the plurality of parameters of the touch gesture is specified according to a gesture definition language.

7. The method of claim 1, wherein said storing the association of the touch gesture with the command comprises associating a unique identifier for the touch gesture with the command and wherein the unique identifier is based on the descriptor for the touch gesture.

8. The method of claim 1, further comprising;
determining a tolerance for one or more of the plurality of parameters of the touch gesture, wherein the tolerance specifies a range of values within which a parameter of another touch gesture is considered equivalent to a corresponding parameter of the touch gesture;
storing the tolerance.

9. A tangible computer-readable storage medium, excluding signal per se, storing program instructions executable on a computer to implement a gesture development tool configured to:
perform a definition process for defining a touch gesture based on a user's repeatedly physically executing the same touch gesture on a touch-enabled device, wherein each iteration of said repeatedly physically executing the same touch gesture comprises:
capturing a plurality of parameters of the touch gesture based on user input physically applied by the user to a touch-sensitive surface of the touch-enabled device to define the touch gesture, wherein each captured parameter of the plurality of captured parameters represents a characteristic of the touch gesture and includes values captured at particular points in time during the iteration;
generate a descriptor for the touch gesture, wherein the descriptor is a representation of the pluralities of parameters captured from the received user input during the iterations of said repeatedly physically executing the same touch gesture;
store the descriptor;
associate the descriptor for the touch gesture with a command to be executed in response to receiving the touch gesture; and
store the descriptor and an association of the touch gesture with the command.

10. The medium of claim 9, wherein the gesture development tool is further configured to perform:
receiving user input indicating a start of the touch gesture definition process.

11. The medium of claim 10, wherein the gesture development tool is further configured to receive an indication from the user that said repeatedly physically executing the same touch gesture is complete prior to said generating the descriptor.

12. The medium of claim 9, wherein the gesture development tool is further configured to perform:
indicating to the user whether a sufficient number of the iterations of said repeatedly physically executing the same touch gesture has been performed to define the touch gesture; and
wherein said generating the descriptor is performed in response to determining that a sufficient number of the iterations of said repeatedly physically executing the same touch gesture has been performed to define the touch gesture.

13. The medium of claim 9, wherein the descriptor for the touch gesture is based on a combination of parameters from the pluralities of parameters.

14. The medium of claim 9, wherein the plurality of parameters of the touch gesture is specified according to a gesture definition language.

15. The medium of claim 9, wherein said storing the association of the touch gesture with the command comprises associating a unique identifier for the touch gesture with the command and wherein the unique identifier is based on the descriptor for the touch gesture.

16. The medium of claim 9, further comprising;
determining a tolerance for one or more of the plurality of parameters of the touch gesture, wherein the tolerance specifies a range of values within which a parameter of another touch gesture is considered equivalent to a corresponding parameter of the touch gesture; and
storing the tolerance.

17. A tangible computer-readable storage medium, excluding signal per se, storing program instructions executable on a computer to implement a gesture classification module configured to:
receive a plurality of parameters applied to a touch-sensitive surface of a touch-enabled device, wherein the plurality of parameters represent a touch gesture, and wherein the touch gesture indicates a command for a software application executing on the touch-enabled device;
analyze the plurality of parameters to create a gesture descriptor corresponding to the touch gesture, wherein the gesture descriptor is a representation of the plurality of parameters of the touch gesture;
compare the gesture descriptor to a set of existing gesture descriptors;
determine one or more existing gesture descriptors that match the gesture descriptor; and
return one or more identifiers of the one or more existing gesture descriptors determined to match the gesture descriptor, wherein the one or more identifiers are used in the software application to determine the command.

18. The medium of claim 17, wherein the one or more existing gesture descriptors are determined to match the gesture descriptor based on a closeness tolerance between each of the one or more existing gesture descriptors and the gesture descriptor.

19. The medium of claim 18,
wherein said returning comprises returning an identifier of one of the one or more existing gesture descriptors which is determined to be a closest match to the gesture descriptor based on a closeness tolerance between the one existing gesture descriptor and the gesture descriptor that indicates that the one existing gesture descriptor is a closer match to the gesture descriptor than the other existing gesture descriptors of the one or more existing gesture descriptors; and
wherein the software application accesses data associating identifiers with commands to determine the command based on the returned identifier.

20. The medium of claim 18,
wherein said returning comprises returning a plurality of identifiers;
wherein a plurality of existing gesture descriptors corresponding to the plurality of identifiers are determined to be the plurality of existing gesture descriptors most closely matching the gesture descriptor based on a closeness tolerance between each of the plurality of existing gesture descriptors and the gesture descriptor; and
wherein the software application accesses data associating identifiers with commands to determine a plurality of commands based on the plurality of returned identifiers and selects a command based on current contextual information associated with the software application.

* * * * *